(12) United States Patent  (10) Patent No.: US 9,030,702 B2
Yonezawa  (45) Date of Patent: May 12, 2015

(54) CLIENT APPARATUS, PRINTING SYSTEM, AND DISPLAY METHOD FOR CONVERTING PRINTING FORMATS, GENERATING PREVIEW IMAGES, AND DISPLAYING PREVIEW IMAGES

(71) Applicant: Hozumi Yonezawa, Tokyo (JP)

(72) Inventor: Hozumi Yonezawa, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 11 days.

(21) Appl. No.: 14/211,506

(22) Filed: Mar. 14, 2014

(65) Prior Publication Data

US 2014/0268237 A1  Sep. 18, 2014

(30) Foreign Application Priority Data

Mar. 15, 2013 (JP) ................................. 2013-054337
Feb. 27, 2014 (JP) ................................. 2014-037006

(51) Int. Cl.
*G06F 3/12* (2006.01)

(52) U.S. Cl.
CPC ............ *G06F 3/1237* (2013.01); *G06F 3/1212* (2013.01); *G06F 3/1247* (2013.01); *G06F 3/1256* (2013.01); *G06F 3/1288* (2013.01)

(58) Field of Classification Search
None
See application file for complete search history.

(56) References Cited

U.S. PATENT DOCUMENTS

| 6,618,167 | B1 * | 9/2003 | Shah ............................. 358/1.15 |
| 7,310,693 | B2 | 12/2007 | Delaplace et al. |
| 8,237,712 | B2 * | 8/2012 | Fagans ............................ 345/428 |
| 2007/0240042 | A1 | 10/2007 | Sato |
| 2008/0151294 | A1 * | 6/2008 | Natori et al. ................. 358/1.15 |
| 2008/0204793 | A1 * | 8/2008 | Shaw ............................ 358/1.15 |
| 2014/0009775 | A1 | 1/2014 | Yonezawa |

FOREIGN PATENT DOCUMENTS

| JP | 2002-196901 | 7/2002 |
| JP | 2005-056414 | 3/2005 |

* cited by examiner

*Primary Examiner* — Jeremiah Bryar
(74) *Attorney, Agent, or Firm* — Harness, Dickey & Pierce, P.L.C.

(57) ABSTRACT

Disclosed is a client apparatus connected to a printing server and configured to instruct the printing server to execute printing. The client apparatus includes a converting unit configured to convert a format of data to be printed into a printable format, an image generator configured to generate a preview image of the data to be printed adapted to a printing condition based on the data of the converted format, and a display unit configured to display the preview image.

8 Claims, 13 Drawing Sheets

FIG.5

| PRINT JOB NO. 208a | (FILE NAME) DATA TO BE PRINTED 208b | PREVIEW IMAGE FLAG 208c |
|---|---|---|
| 1 | A DATA TO BE PRINTED | 1 (CREATED) |
| 2 | B DATA TO BE PRINTED | 1 (CREATED) |
| 3 | C DATA TO BE PRINTED | 1 (CREATED) |
| 4 | D DATA TO BE PRINTED | 1 (CREATED) |
| 5 | E DATA TO BE PRINTED | 1 (CREATED) |
| 6 | F DATA TO BE PRINTED | 0 (UNCREATED) |

FIG.6

| FILE NAME 209a | PREVIEW IMAGE ID 209b | PRINTING CONDITION 209c |
|---|---|---|
| A | a1 | PA1 |
| B | b1 | PB1 |
| C | c1 | PC1 |
| A | a2 | PA2 |
| C | c2 | PC2 |
|  |  | ⋮ |

FIG. 12
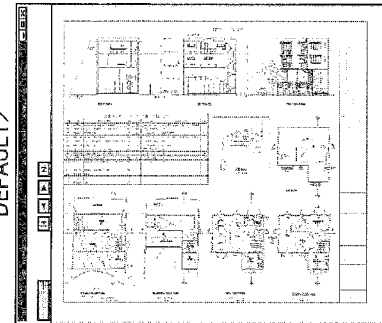
<INPUT IMAGE SCREEN: DEFAULT>
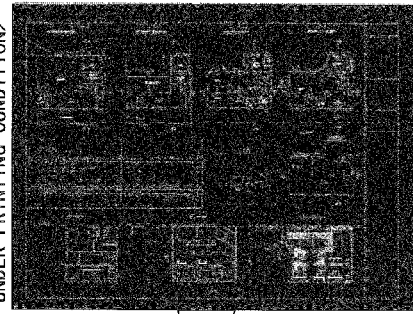
<PREVIEW IMAGE: AFTER EDITED UNDER PRINTING CONDITION>
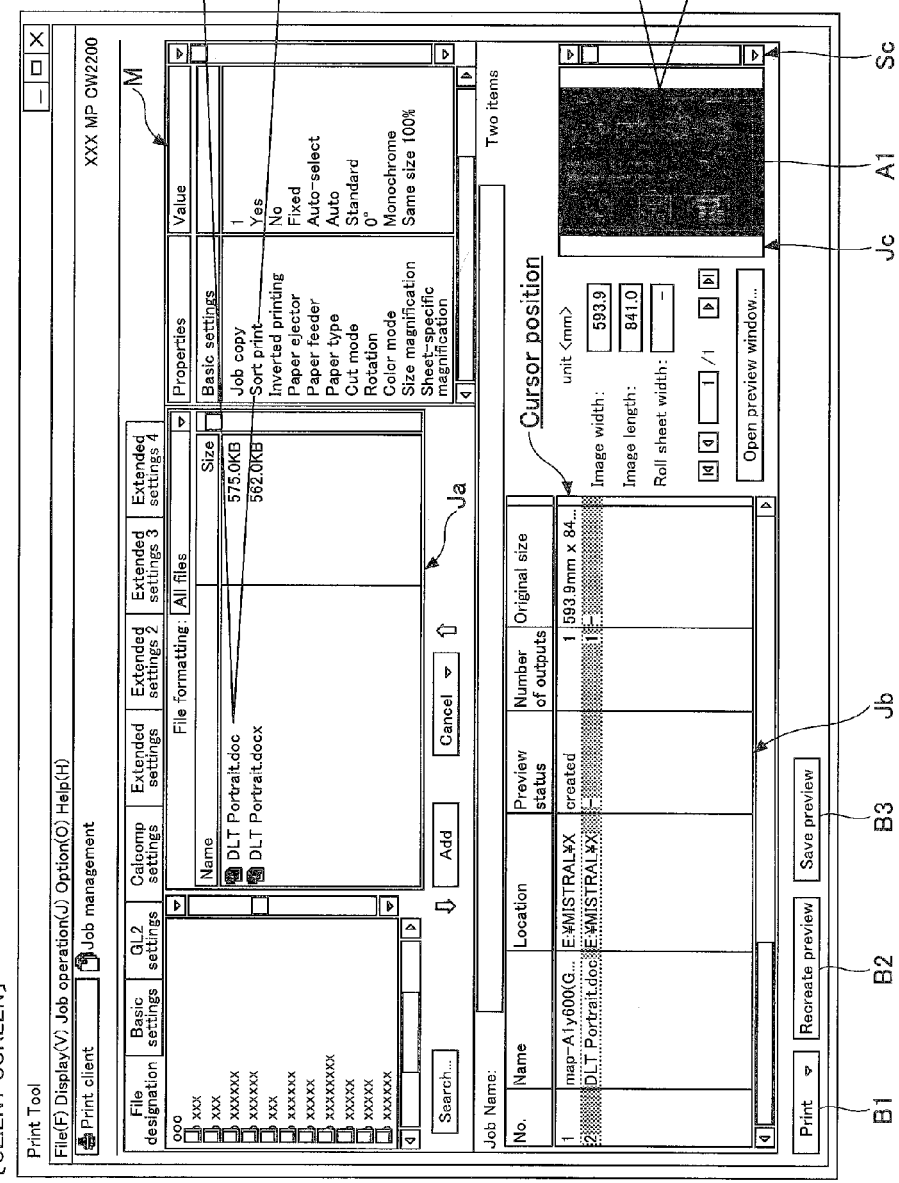

CLIENT APPARATUS, PRINTING SYSTEM, AND DISPLAY METHOD FOR CONVERTING PRINTING FORMATS, GENERATING PREVIEW IMAGES, AND DISPLAYING PREVIEW IMAGES

BACKGROUND OF THE INVENTION

1. Field of the Invention

The disclosures discussed herein relate to a client apparatus, a printing system, and a display method.

2. Description of the Related Art

There is disclosed a printing technology known in the art in which a printing server rasterizes data to be printed and transmits the generated image data to a printer so as to cause the printer to perform printing based on image data. When printed matter (a printed result) printed by the printer differs from an image conceived by a user who has directed the printing, the printing server may be able to form (print) an image from the data to be printed again based on the printing condition changed by the user and the like.

Specifically, in a case of wide-width printing, various types of file format data including drawings may be subject to image formation. Accordingly, in the case of wide-width printing, a drawing process time for drawing the data may take longer than that for normal printing, and hence, it may take a long time to obtain printed matter. Thus, in the case of wide-width printing, it may be desirable to avoid repeatedly printing based on the same data.

Japanese Laid-open Patent Publication No. 2005-56414 (hereinafter referred to as "Patent Document 1") discloses a technology in which a printing server transfers preview image data generated from data to be printed to a client apparatus, and the client apparatus displays a preview on its screen. In this configuration, a user may be able to check a preview image as a printed result on the screen before printing.

However, in the technology disclosed in Patent Document 1, the preview image data are transferred from the printing server to the client apparatus via a network. Hence, a longer time may be required for displaying the preview image on the client apparatus due to high load imposed for transferring image data from the printing server to the client apparatus via the network, which may degrade the convenience for users. Specifically, when a user desires wide-width printing, a large amount of image data needs to be transferred, which may further increase the time to display the preview image on the screen of the client apparatus.

RELATED ART DOCUMENTS

Patent Document

Patent Document 1: Japanese Laid-open Patent Publication No. 2005-56414

SUMMARY OF THE INVENTION

Accordingly, it is an object of at least one embodiment of the invention to provide a technology to quickly display a preview image before printing.

According to an aspect of the present invention, there is provided a client apparatus connected to a printing server and configured to instruct the printing server to execute printing. The client apparatus includes a converting unit configured to convert a format of data to be printed into a printable format; an image generator configured to generate a preview image of the data to be printed adapted to a printing condition based on the data of the converted format; and a display unit configured to display the preview image.

Other objects, features and advantages of the present invention will become more apparent from the following detailed description when read in conjunction with the accompanying drawings.

BRIEF DESCRIPTION OF THE DRAWINGS

FIG. 5 is a diagram illustrating an example of an image data DB according to an embodiment;

FIG. 6 is a diagram illustrating an example of a printing condition DB according to an embodiment;

FIG. 12 is a display example of an input image and a preview image according to an embodiment;

DETAILED DESCRIPTION OF THE PREFERRED EMBODIMENTS

Figure 1:
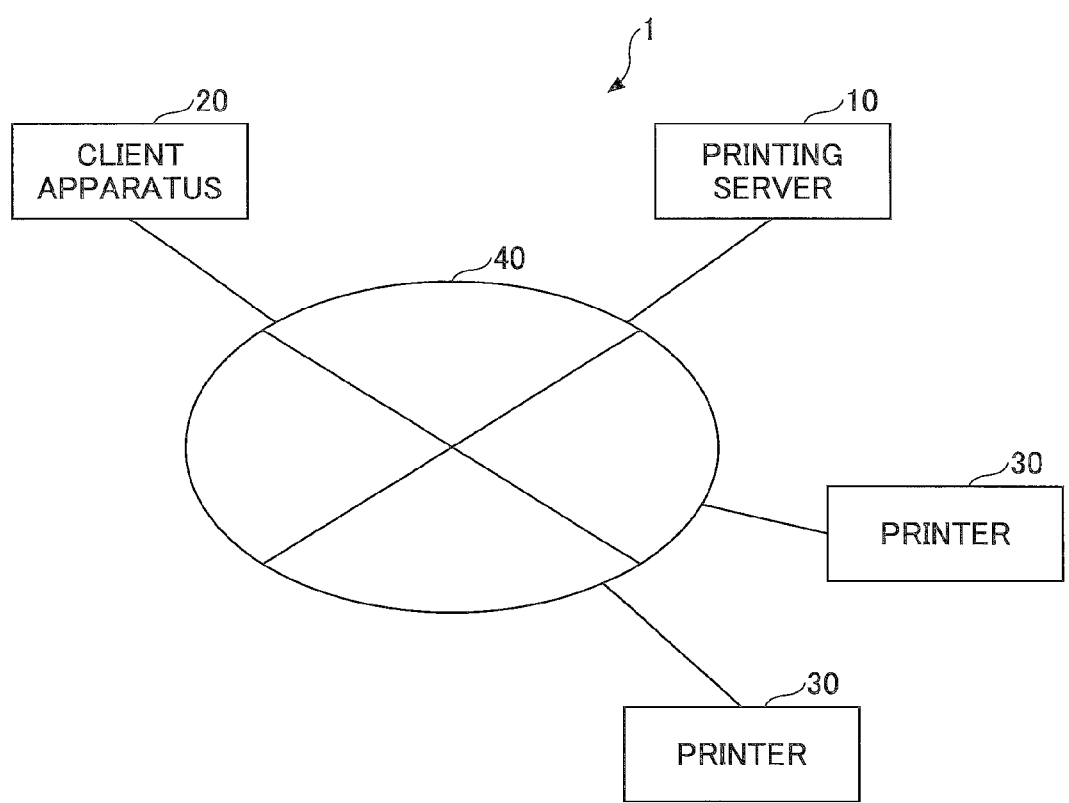
FIG. 1 is a schematic configuration diagram illustrating a printing system according to an embodiment.

In the following, a description is given, with reference to the accompanying drawings, of preferred embodiments of the present invention. Note that in the specification and drawings of the present application, substantially the same components are provided with the same reference numerals, and duplicated descriptions are omitted.

[Schematic Configuration of Printing System]

Initially, a description is given of a printing system according to an embodiment with reference to FIG. 1. FIG. 1 is a schematic configuration diagram illustrating a printing system 1 according to an embodiment. The printing system 1 includes a printer server 10, a client apparatus 20, and two or more printers 30. The printer server 10, the client apparatus 20, and the two or more printers 30 are capable of communicating with one another via a network 40.

The client apparatus 20 transmits to the printing server 10 data to be printed. The client apparatus 20 may be a PC (personal computer), a tablet terminal, a mobile phone, and the like.

The printing server 10 performs a drawing process on the data to be printed to acquire drawing data. In the drawing process, data to be printed are rasterized to produce raster data as the drawing data. The printing server 10 transmits the drawing data to any of the printers 30.

The printer 30 forms an image based on the received drawing data to print the image. Note that the printers 30 may be multifunction peripherals (MFP) having at least two of the functions serving as a copier, a printer, a scanner, and a facsimile machine. Further, the printers 30 may be wide-format copiers or wide-format multifunctional peripherals.

In the printing system 1 according to an embodiment, the client apparatus 20 includes a drawing function. Hence, the client apparatus 20 itself may rasterize data to be printed to generate drawing data. Accordingly, it is not necessary to transfer the drawing data from the printing server 10 to the client apparatus 20. Thus, a preview image before printing may quickly be displayed on a screen of the client apparatus 20. In the following, illustration is sequentially given of functional configurations of the printing server 10 and the client apparatus 20, and respective processes performed by the printing server 10 and the client apparatus 20.

[Functional Configuration of Printing Server]

Figure 2:
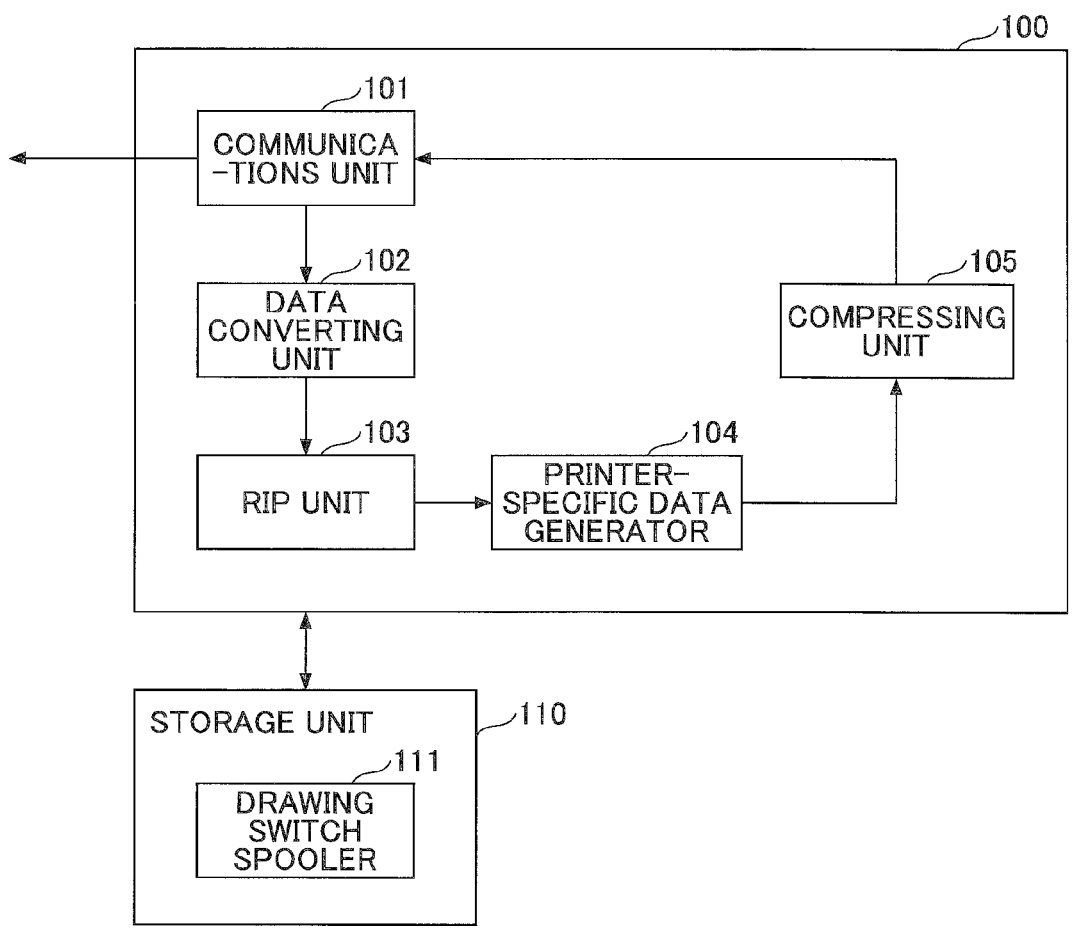
FIG. 2 is a functional configuration diagram illustrating a printing server according to an embodiment.

The functional configuration of the printing server according to an embodiment is described with reference to FIG. 2.

The printing server 10 includes a process unit 100 and a server-side storage unit 110 (hereinafter, simply called a "storage unit 110"). The process unit 100 includes a server-side communications unit 101 (hereinafter, simply called a "communications unit 101"), a server-side data converting unit 102 (hereinafter, simply called a "data converting unit 102"), a server-side RIP (Raster Image Processor) unit 103 (hereinafter, simply called a "RIP unit 103), a printer-specific data generator 104, and a compressing unit 105. Further, the storage unit 110 includes a drawing switch spooler 111.

The communications unit 101 transmits to and receives from the client apparatus 20 and the printers 30 various information via the network 40. The communications unit 101 may, for example, receive a printing instruction from the client apparatus 20. When receiving the printing instruction from the client apparatus 20, the communications unit 101 receives from the client apparatus 20 data to be printed and a printing condition for generating a preview image corresponding to the data to be printed. The communications unit 101 transmits to the printer 30 via the network 40 the data to be printed and the printing condition, or the drawing data (drawing data identical to the preview image) acquired by executing the drawing process on the data to be printed.

The data converting unit 102 converts a file format of the input data to be printed into a file format capable of being processed by the printing server 10. Specifically, the data converting unit 102 converts the data to be printed into data of a PDL (Page description language) format. Note that in this embodiment, the data converting unit 102 converts the data to be printed into data of a PS (Postscript) format, for example. Note that examples of the file format of the data to be printed that are input into the data converting unit 102 via the communications unit 101 include HPGL (Hewlett-Packard Graphics Language), TIFF (Tagged Image File Format), Calcomp, JPEG (Joint Photographic Experts Group), DWG, Word, Excel, and the like. The data converting unit 102 corresponds to a converting unit configured to convert data using a converting filter adapted to the file format of the input data.

The RIP unit 103 performs a drawing process on the PDL data acquired from the data converting unit 102 to acquire the drawing data. Specifically, the RIP unit 103 rasterizes the PS data serving as an example of the data to be printed to generate raster data serving as the drawing data.

The printer-specific data generator 104 generates printer-specific data that are the drawing data (i.e., raster data) acquired by the RIP unit 103 with the printing condition.

Note that the printer-specific data generator 104 converts a format of the printer-specific data into a format capable of being processed by the printer 30 that executes printing.

The compressing unit 105 performs a compressing process on the printer-specific data acquired by the printer-specific data generator 104. When raster data included in the printer-specific data are multiple-valued data, the compressing unit 105 performs a reversible compressing process corresponding to multiple values. However, when the raster data are binary data, the compressing unit 105 performs a reversible compressing process corresponding to binary values. Accordingly, in a decompression process in the printer 30, multiple-valued data are obtained from the compressed data of the multiple-valued data, and binary data are obtained from the compressed data of the binary-valued data.

The compressed printer-specific data are transmitted by the communications unit 101 to the printer 30 that executes printing.

Figure 3:
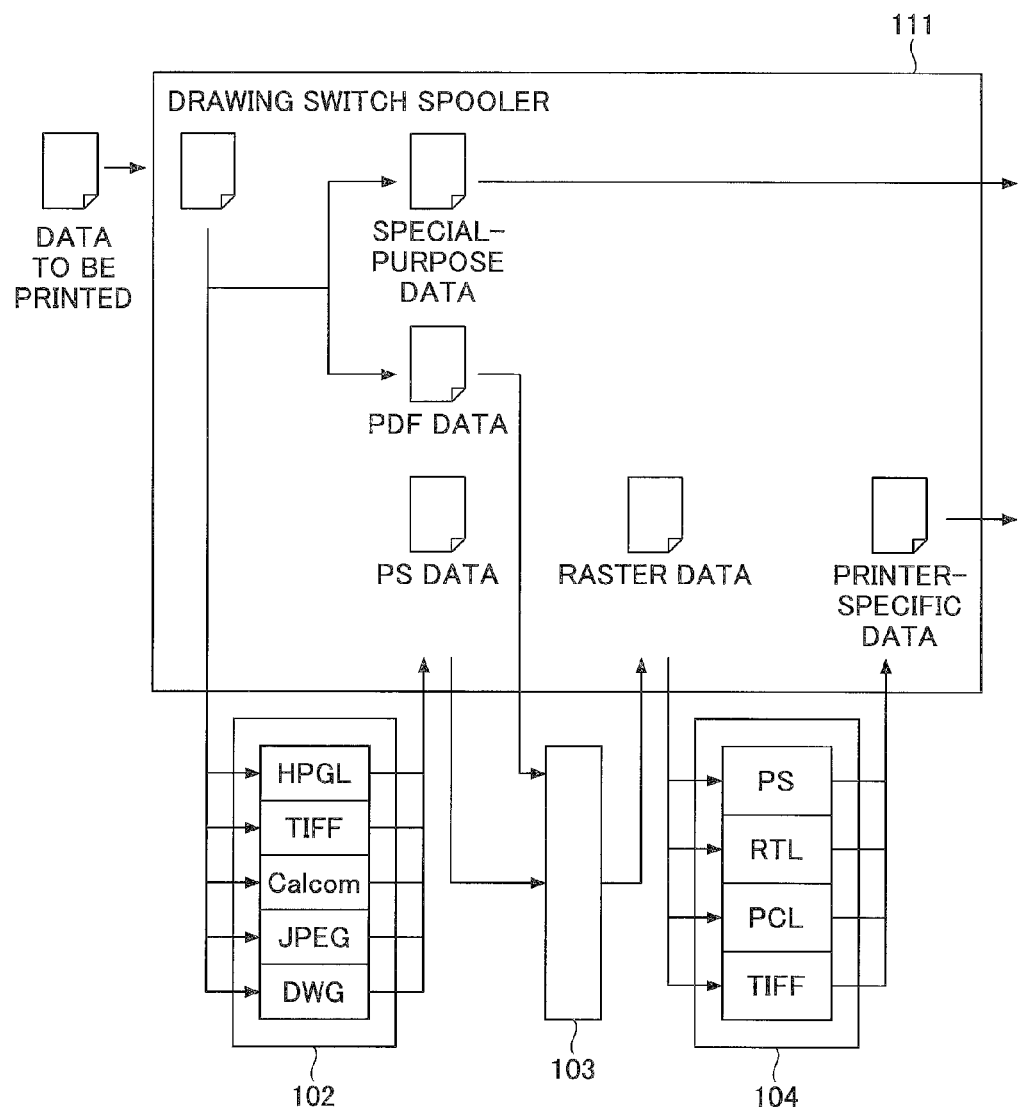
FIG. 3 is a diagram illustrating an example of data spooled in a drawing switch spooler according to an embodiment.

The drawing switch spooler 111 stores various data handled by the printing server 10. FIG. 3 illustrates data spooled in the drawing switch spooler 111. The drawing switch spooler 111 receives the data to be printed, the printing of which is directed by the client apparatus 20. The data to be printed are converted into the PS data by a converting filter adapted to the file format of the data to be printed in the data converting unit 102, and the PS data are input to the drawing switch spooler 111.

The PS data are converted into raster data by the RIP unit 103, and the raster data are supplied to the drawing switch spooler 111. Note that when the data to be printed are PDF (portable document format) data, the data are not to be converted by the data converting unit 102. The PDF data are read by the RIP unit 103, which are then converted into raster data. Further, when the data to be printed are special-purpose data capable of being translated by a predetermined printer 30, the data are not to be converted but to be directly transmitted to the printer 30.

In addition, the raster data are read by the printer-specific data generator 104. The printer-specific data generated by the printer-specific data generator 104 are input to the drawing switch spooler 111. The format printer-specific data are capable of being translated by a transmission destination that is the printer 30.

[Functional Configuration of Client Apparatus]

Figure 4:
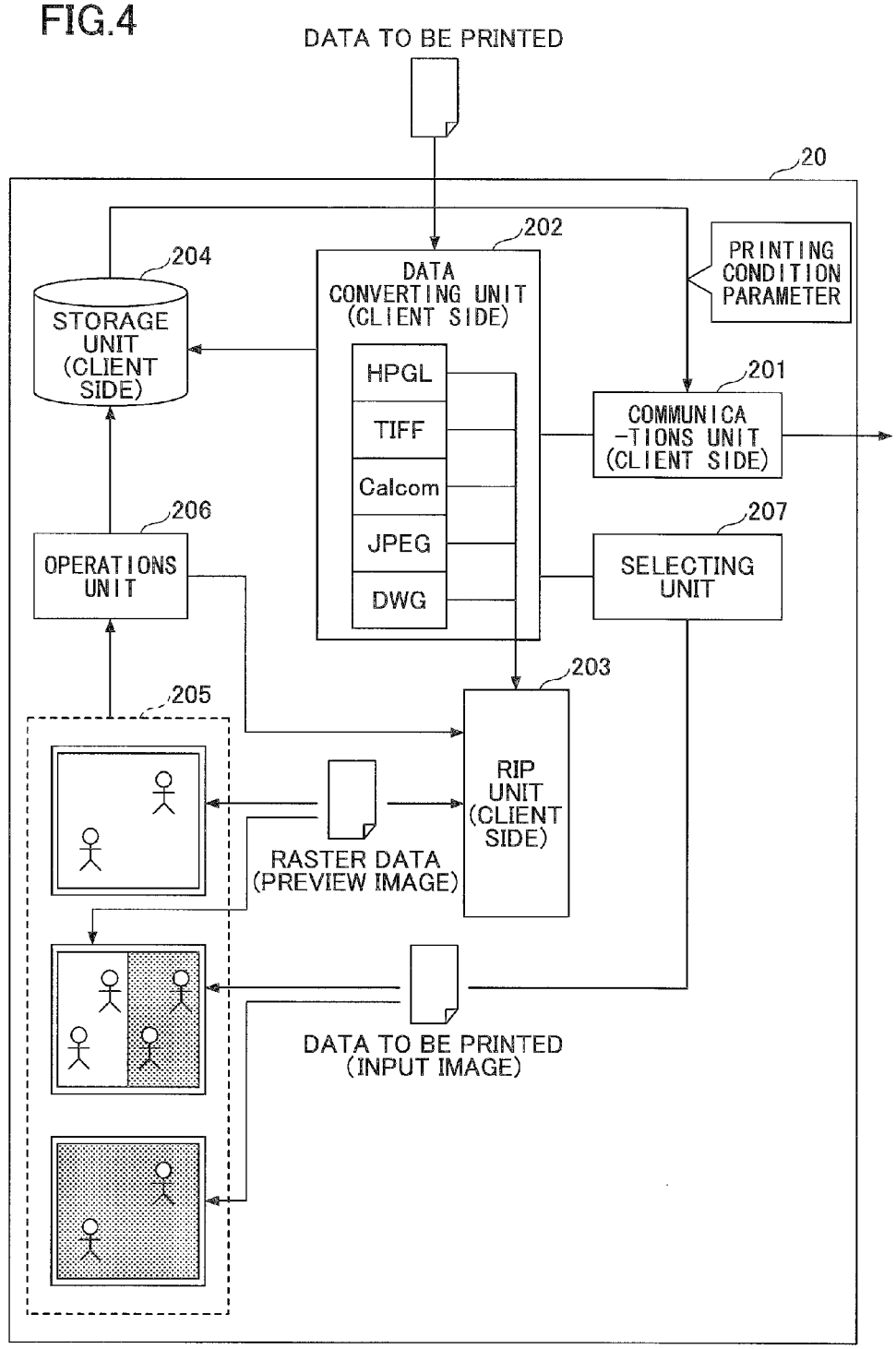
FIG. 4 is a functional configuration diagram illustrating a client apparatus according to an embodiment.

Next, a functional configuration of the client apparatus 20 according to an embodiment is described with reference to FIG. 4. The client apparatus 20 includes a client-side communications unit 201 (hereinafter simply called a "communications unit 201"), a client-side data converting unit 202 (hereinafter simply called a "data converting unit 202"), a client-side RIP unit 203 (hereinafter simply called a "RIP unit 203"), a client-side storage unit 204 (hereinafter simply called a "storage unit 204"), a display unit 205, an operations unit 206, and a selecting unit 207.

The communications unit 201 transmits to and receives from the printing server 10 various information via the network 40. The communications unit 201 may, for example, transmit a printing instruction to the printing server 10. When transmitting the printing instruction to the printing server 10, the communications unit 201 transmits to the printing server 10 data to be printed by the printing server 10 and a printing condition for generating a preview image corresponding to the data to be printed. The printing condition includes a printing format, a sheet size, size magnification, a cleaner, density, inclination, double-sided/single-sided, and stapling, and the like in addition to the printing instruction.

The data converting unit 202 converts a file format of the data to be printed into a file format capable of being processed by the printing server 10. Specifically, the data converting unit 202 converts the data to be printed into data of a PDL (Page description language) format. Note that the data converting unit 202 includes a function similar to that of the data converting unit 102 of the printing server 10. In this embodiment, the data converting unit 202 converts the data into data of the PS (Postscript) format, for example. Examples of the data format of the data to be printed that are input into the data converting unit 202 include HPGL, TIFF, Calcomp, JPEG, DWG, Word, Excel, and the like. The data converting unit 202 converts data using a converting filter adapted to the file format of the input data.

The RIP unit 203 includes a function similar to that of the RIP unit 103 of the printing server 10, performs a drawing process on the PS data acquired by the data converting unit 202, and generates a preview image of the data to be printed according to the printing condition. When a format of the converted data is stored as a print job in a later-described image data DB (database), the RIP unit 203 sequentially generates preview images. The RIP unit 203 rasterizes the data to be printed serving as the PS data to generate raster data. The RIP unit 203 corresponds to an image forming unit configured to form a preview image of the data to be printed according to the printing condition, based on the data having a format converted by the data converting unit 202.

The raster data generated by the RIP unit 203 are displayed by the display unit 205 on a screen of the client apparatus 20 as a preview image. Note that the storage unit 204 assigns a specific file name to the input data to be printed and stores the input data to be printed with the specific name in an image data DB 208. That is, as illustrated in FIG. 5, the storage unit 204 stores in the image data DB 208 a print job No. 208a, the data to be printed corresponding to the print job No. 208a (i.e., see 208b representing the data to be printed assigned with a specific file name in FIG. 5), and a flag 208c indicating whether the preview image is displayed based on the data to be printed represented by the file name. The image data DB 208 may be stored together with the data to be printed or data having a converted format (the data to be printed with the specific file name represented by 208b in FIG. 5 assigned) in place of the data to be printed.

The storage unit 204 stores in a printing condition DB (database) 209 (see FIG. 6) a file name 209a of the data to be printed, a preview image ID 209b generated based on the data to be printed, and a printing condition 209c when the preview image is generated. Note that the file name 209a of the data to be printed is an example of identifier information of the data to be printed, and the preview image ID 209b is an example of identifier information of the preview image.

The storage unit 204 may store the data to be printed itself or converted data having a format capable of being printed in place of the data of the file name 209a.

In the printing condition DB 209, different printing conditions 209c may be stored with respect to plural preview images 209b generated based on identical data to be printed having the same file name 209a. For example, in FIG. 6, "PA1" and "PA2" representing the printing condition 209c are stored corresponding to "a1" and "a2" representing the preview image ID 209b that respectively identify two preview images generated based on the data to be printed having the same file name 209a indicated by "A". Similarly, "PC1" and "PC2" representing the printing condition 209c are stored corresponding to "c1" and "c2" representing the preview image ID 209b that respectively identify two preview images generated based on the data to be printed having the same file name 209a indicated by "C". On the other hand, "PB1" representing the printing condition 209c are stored corresponding to "b1" representing the preview image ID 209b that identifies a preview image generated based on the data to be printed having the file name 209a indicated by "B".

The operations unit 206 sets a printing condition. For example, when a user performs a setting operation on an operations screen of the printing condition after checking the preview image, the operations unit 206 changes the printing condition with respect to the data to be printed based on the setting operation performed by the user.

The selecting unit 207 selects a print job selected by the operation of the user. The display unit 205 pop-up displays an input image of the data to be printed of the selected print job. Of the selected print job, it may be possible to simultaneously display the data to be printed and a preview image generated based on the data to be printed on the same screen. Details of the displayed status are described later.

[Sequence of Printing Process]

Figure 7:
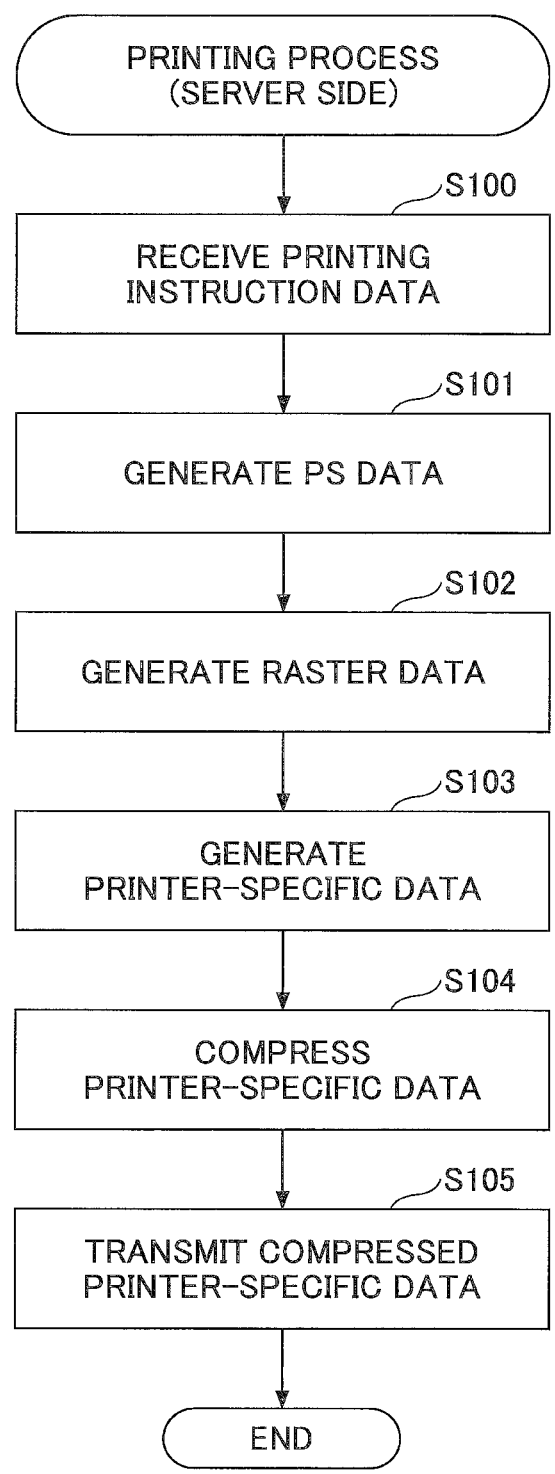
FIG. 7 is a flowchart illustrating a printing process according to an embodiment.

Next, a description is given, with reference to FIG. 7, of a sequence of a printing process according to an embodiment executed by the printing server 10. FIG. 7 is a flowchart illustrating a printing process according to an embodiment.

The communications unit 101 receives data to be printed and a printing condition as printing instruction data (step S100). Next, the data converting unit 102 generates PS data by converting the data to be printed that are included in the printing instruction data into the PS data. Next, the RIP unit 103 rasterizes the PS data to generate raster data (step S102). Subsequently, the printer-specific data generator 104 generates printer-specific data by assigning the printing condition to the raster data using the printing condition included in the printing instruction data (step S103).

Next, the compressing unit 105 compresses the printer-specific data (step S104). Subsequently, the communications unit 101 transmits the compressed printer-specific data to the printer 30 that executes printing (step S105). The printer 30 serving as a transmitting destination receives the compressed printer-specific data, decompress the compressed printer-specific data, forms an image based on the decompressed raster data, and outputs printed matter. The printing process by the printing server 10 is then completed.

[Sequence of Print Preview Process]

Figure 8:
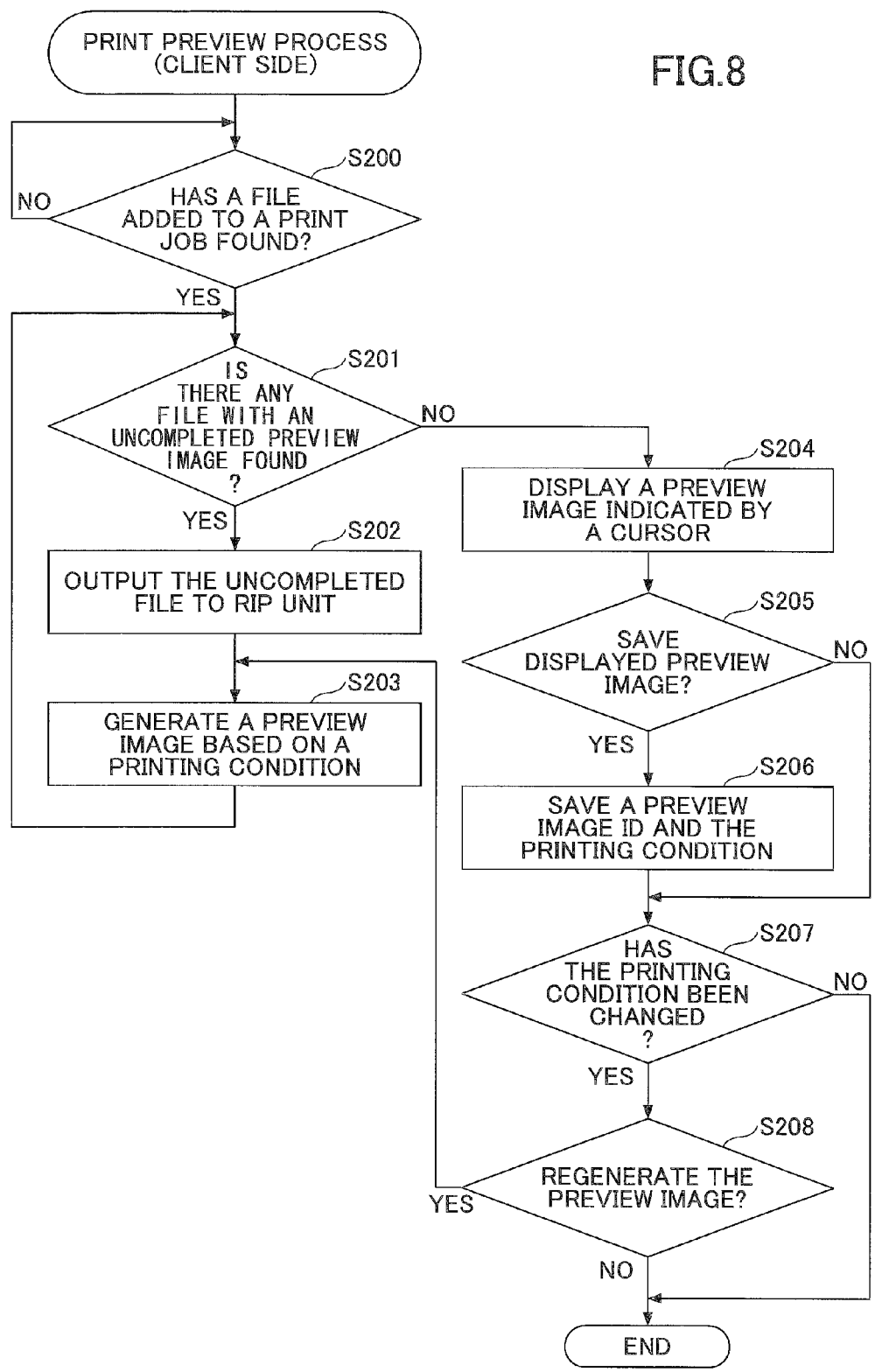
FIG. 8 is a flowchart illustrating a print preview process according to an embodiment.

Next, a description is given, with reference to FIG. 8, of a sequence of a print preview process according to an embodiment executed by the client apparatus 20. FIG. 8 is a flowchart illustrating a print preview process according to an embodiment.

The data converting unit 202 repeatedly determines whether a file of a new print job No. 208a is added to the image data DB 208 illustrated in FIG. 5 until the file of the new print job is added (step S200). When the data converting unit 202 determines that the file of the new print job is added to the image data DB 208, the data converting unit 202 converts a file format of the data to be printed into a file format capable of being printed by the printing server 10, and determines whether there is any file with an uncreated (uncompleted) preview image (step S201). As illustrated in FIG. 5, of the print jobs added to the image data DB 208, a file of the preview having a flag 208 of "0" corresponds to the file with the uncreated (uncompleted) preview image. The data converting unit 202 outputs the file (converted file) with the uncreated preview image to the RIP unit 203 (step S202).

Next, the RIP unit 203 generates a preview image with respect to the input data to be printed according to a printing condition (step S203). When a new printing condition is set by the user's operation, the new printing condition is used, and when the new printing condition is not set by the user's operation, an initial setting condition is used.

Figure 9:
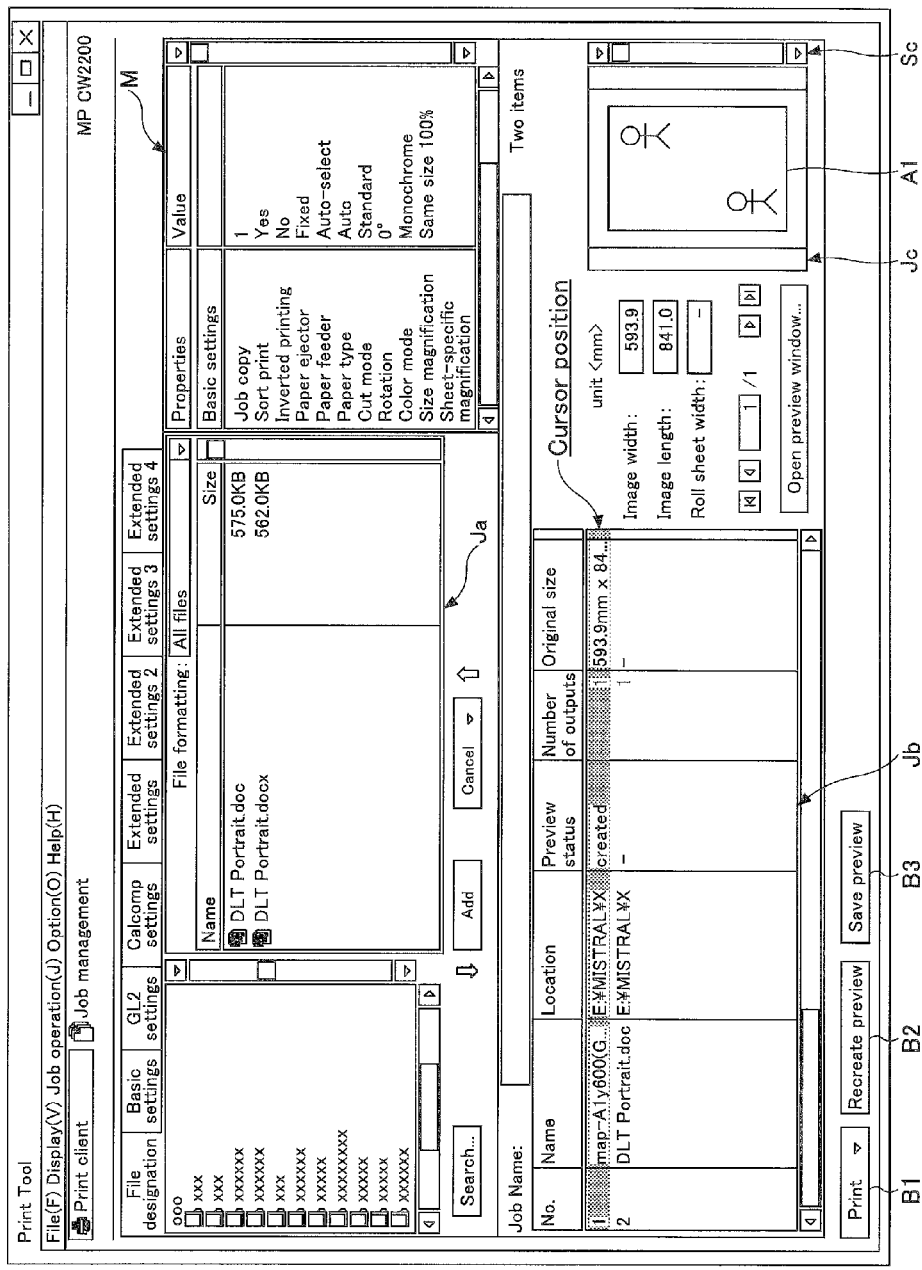
FIG. 9 is a display example of a preview image based on a print preview process according to an embodiment.

Returning to step S201, steps S201 to S203 are repeated until there is no file with an uncreated preview image. Of the added print jobs, when all the flags 208c of the preview images are "1", it is determined that there is no file with an uncreated preview image in step S201. In this case, the display unit 205 displays a preview image of the print job at which a cursor is located (pointed by the cursor) (step S204). FIG. 9 illustrates a display example of the preview image. As illustrated in FIG. 9, a screen includes a region Ja that displays the data to be printed input into the client apparatus 20, a region Jb that displays print job statuses, and a region M that displays a set printing condition in addition to a region Jc that displays a preview image. In this example, a preview image A1 of the print job No. "1" pinted by the cursor within the region Jb is displayed in the display region Jc.

Subsequently, the operations unit 206 determines whether to save the displayed preview image (step S205). When a "Save preview" button B3 displayed on a lower side of the screen of FIG. 9 is pressed by the user, the operations unit 206 determines to save the preview image. In this case, the storage unit 204 stores the ID "a1" of the displayed preview A1 and the printing condition "PA1" with the file name "A" of the data to be printed (step S206), and then the process proceeds with step S207. When the "Save preview" button B3 is not pressed by the user, the operations unit 206 determines not to save the preview image, and then the process proceeds with step S207.

Next, the operations unit 206 determines whether the printing condition has been changed (step S207). The user may change settings of the printing condition, such as size magnification, an output destination, and a converting format by switching tabs displayed on an upper side of the screen of FIG. 9 for setting the printing condition. When the user sets a new printing condition by switching tabs displayed on the upper side of the screen of FIG. 9 for setting the printing condition, the operations unit 206 determines that the printing condition has been changed, and subsequently determines whether to regenerate the preview image (step S208). When a "Regenerate preview" button B2 displayed on the lower side of the screen of FIG. 9 is pressed by the user, the operations unit 206 determines to regenerate the preview image, and then the process proceeds with step S203. The RIP unit 203 regenerates the preview image based on the printing condition (step S203), and then the process returns to step S201.

When the operations unit 206 determines that the printing condition has not been changed in step S207, or that the preview image is not to be regenerated in step S208, the print preview process ends.

In the following, illustration is given of operation of the screen of FIG. 9. Initially, the user selects a file from a list of files on the left hand side of the Ja region of the screen. In the example of FIG. 9, "DLT Portratit.doc" and "DLT Portrait-.docx" are selected.

Subsequently, the user sets setting items to indicate under what printing condition the file is to be printed. Examples of setting items include a "Basic settings" tab, an "Extended settings" tab, and the like on the upper side of the screen of FIG. 9. As illustrated in the M region of the screen of FIG. 9, settings include sort, rotation, and the like.

After the settings are completed, a job is added to the region Jb of FIG. 9 by selecting an "Add" button beneath the Ja region of the screen. FIG. 9. When the job is added, the data converting unit 202 determines whether a preview of the file is uncreated as described above. In this case, when the job is a newly added one, a preview of the file uncreated, and hence, the preview is created.

When the preview is created, a "Preview status" of the Jb region of FIG. 9 is changed to "created". A preview is displayed when the user moves the cursor to the job after the "Preview status" is changed to "created". When the user desires to save the displayed preview, the user presses the "Save preview" button B3 of FIG. 9 to save a preview image, the ID, and the printing condition.

When the user further desires to display a preview with a different printing condition, the user selects the job within the Ja region of FIG. 9. When the job is selected, the region M of the screen displays a printing condition set in the job. The user may change settings of the printing condition by switching the "Basic settings" tab, the "Extended settings" tab, and the like on the upper site of the screen of FIG. 9.

When the user presses a "Recreate preview" button B2 after the printing condition is changed, a preview is generated under a newly set printing condition. Note that when the printing condition is returned to the initial status, the previously created preview image may be displayed by referring to the printing condition DB that stores the previously created preview image. When the printing condition is changed as described above, step S207 in FIG. 8 determines whether the file name of the file with the changed printing condition is stored. When the changed printing condition and the file name of the file with the changed printing condition are stored in the printing condition DB, a preview image will not be recreated (i.e., "NO" in step S207).

As illustrated above, in this embodiment, the client apparatus 20 includes the RIP unit 203, and the client apparatus 20 generates preview image data to display a preview on a screen of the client apparatus 20. In this configuration, it may be possible to quickly display a preview image before printing without transferring the preview image data from the printing server 10 to the client apparatus 20. For example, the client apparatus 20 displays a layout or a printing range of a printing subject with respect to an output size (a size of sheets in the tray) of the sheet, based on tray information acquired from the printing condition. Thus, the user is able to quickly check a reduced-sized image of the subject to be printed displayed on the screen.

Note that this embodiment illustrates an example in which the preview image of the print job that is indicated (pointed at) by the cursor in the region Jb of FIG. 9 is displayed. However, the method of indicating (selecting) a preview image of a subject to be displayed is not limited to the above-described method. For example, a preview image of the subject to be displayed may be selected (indicated) by clicking or dragging and dropping a specific print job in the region Jb.

[Sequence of Selecting Preview Process]

Figure 10:
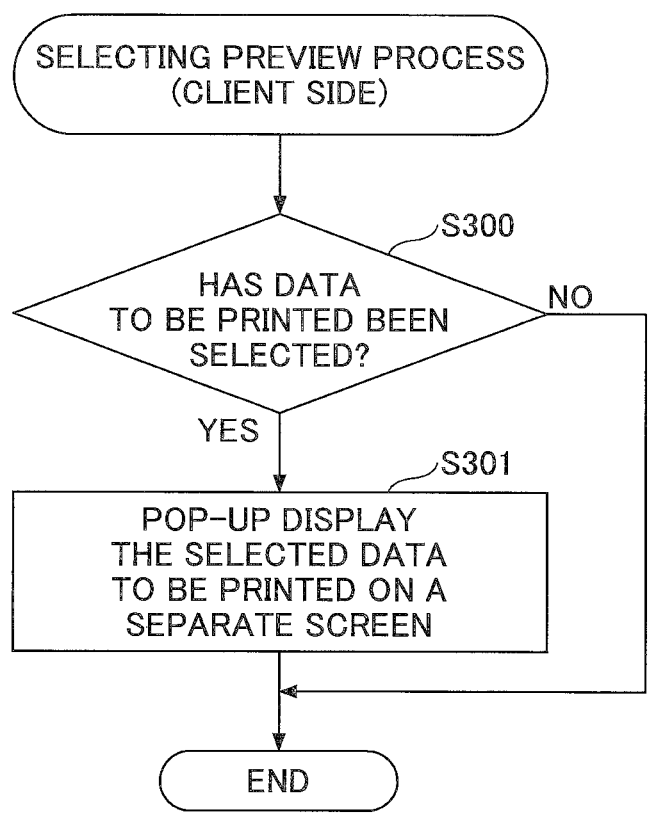
FIG. 10 is a flowchart illustrating a selecting preview process according to an embodiment.

Next, a description is given, with reference to FIG. 10, of a sequence of a selecting preview process according to an embodiment executed by the client apparatus 20. FIG. 10 is a flowchart illustrating a selecting preview process according to an embodiment.

The selecting unit 207 determines whether the data to be printed input in the client apparatus 20 has been selected (step S300). In this embodiment, the double-clicked one of the data to be printed in the region Ja of FIG. 9 is selected. However, the method of selecting the data to be printed is not limited to the double-click method. The data to be printed may be selected by clicking or dragging and dropping one of the data to be printed displayed in the region Ja.

When the selecting unit 207 determines that any one of the data to be printed has been selected, the display unit 205 switches the currently displayed screen to a separate screen to pop-up display an input image of the selected one of the data to be printed (step S301), and the selecting preview process then ends. When the selecting unit 207 determines that any one of the data to be printed has not been selected ("NO" in step S300), the selecting preview process immediately ends.

Figure 11:
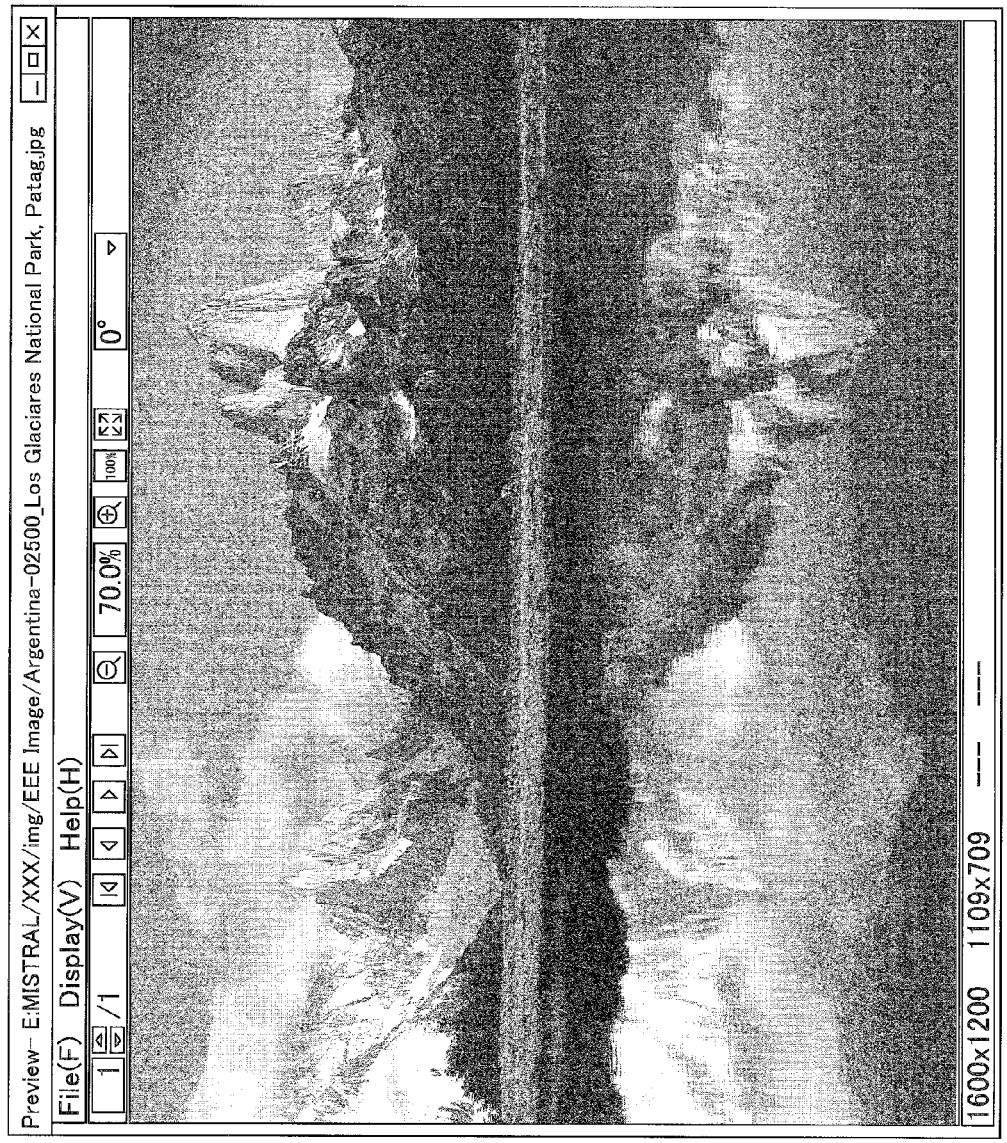
FIG. 11 is a display example of an input image based on a selecting preview process according to an embodiment.

FIG. 11 is an example of the pop-up displayed input image of the selected one of the data to be printed. Accordingly, the user may be able to check the selected one of the input images by switching the screen to the separate screen to enlarge or reduce the size of the displayed image. Further, the user may be able to display the selected input image in a full screen, by the same size, or as a result of rotation by 0, 90, 180, or 270 degrees. In addition, a page number or a file name of the data to be printed may be displayed with the selected input image on the screen. Thus, the user may be able to check detailed contents of the input image that are default values of the subject to be printed.

Moreover, the input image and the preview image corresponding to the same data to be printed are displayed in comparison. For example, the uppermost file within the region Ja is selected, and the cursor within the region Jb is located at the print job (having the same name as that of the uppermost file within the region Ja) of the preview image generated from the selected data to be printed in the example of the screen illustrated in FIG. 12. In this case, the input image and the preview image corresponding to the same data to be printed are displayed on the same screen as illustrated on the right hand side of FIG. 12. According to this example, the input image representing a default status with respect to the same data to be printed may be compared with the preview image that is obtained by editing the data to be printed based on the printing condition. Accordingly, the user may be able to compare the input image before printing and the preview image representing the printed result to check the difference and effects. For example, the user may be able to check contaminants (unnecessary dots, etc.) in two screens, the density difference between the two screens, or respective layouts and aggregated statuses in the two screens.

[Sequence of Printing Instruction Process]

Figure 13:
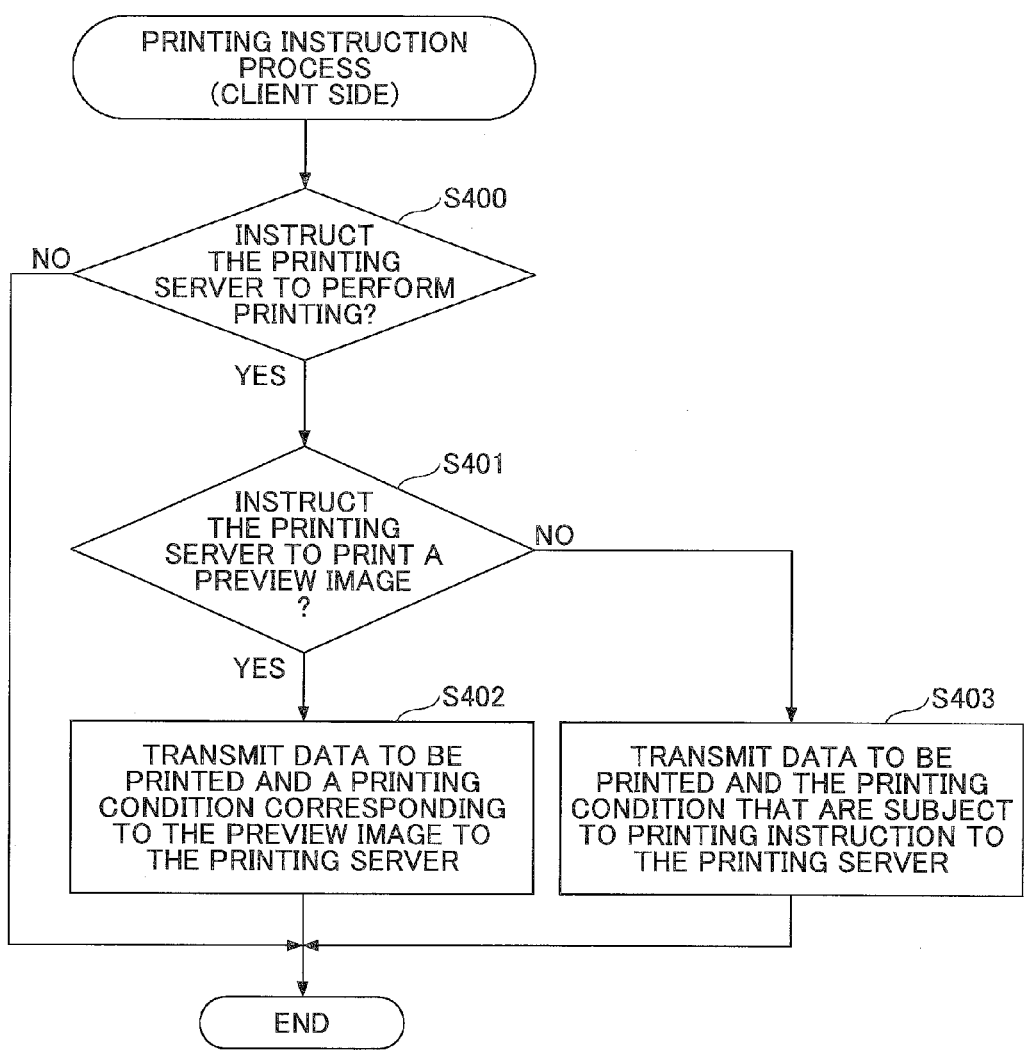
FIG. 13 is a flowchart illustrating a printing instruction process according to an embodiment.

Next, a description is given, with reference to FIG. 13, of a sequence of a printing instruction process according to an embodiment executed by the client apparatus 20. FIG. 13 is a flowchart illustrating a printing instruction process according to an embodiment.

The operations unit 206 determines whether to instruct the printing server 10 to execute printing (step S400). When the user presses a "Print" button B1 displayed on the lower side of the screen of FIG. 9, the operations unit 206 determines that printing has been directed, and proceeds with a next step to determine whether to direct printing of the displayed preview (step S401). When the operations unit 206 determines that printing of the preview image that is displayed by the user's operation has been directed, the communications unit 201 transmits the data to be printed and the printing condition corresponding to the preview image to the printing server 10 (step S402). In this case, the communications unit 201 transmits the data to be printed and the printing condition stored in association with the preview image in the printing condition DB to the printing server 10. The printing instruction process then ends.

On the other hand, when the operations unit 206 determines that printing of the preview image that is not displayed by the user's operation has been directed, the communications unit 201 transmits the data to be printed and the printing condition corresponding to a preview image that is directed to be printed to the printing server 10 (step S403). In this case, the communications unit 201 transmits the data to be printed and the printing condition stored in association with the preview image specified (selected) by the user's operation in the printing condition DB to the printing server 10. The printing instruction process then ends.

Note that when the "Print" button B1 is not pressed by the user in step S400, the operations unit 206 determines that printing has not been directed, and immediately ends the printing instruction process.

As described above, in the printing system 1 according to the embodiment, the client apparatus 20 includes the RIP unit 203 for preview in a manner similar to the printing server 10. In this configuration, the client apparatus 20 may be able to generate a preview image and quickly display the generated preview. Specifically, even in a case of wide width printing handling large size data, the client apparatus 20 may be able to allow the user to easily check a printing status by generating a preview image to display the generated preview image without receiving the preview image from the printing server 10.

Further, in the printing system 1 according to the embodiment, the input image may be pop-up displayed on the screen by double-clicking any one of the files. Accordingly, the user may be able to easily check the details of the image by enlarging or rotating the displayed input image. Specifically, the image before printing and the image of the printed result may be compared by displaying the preview image in comparison with the input image. Hence, the user may be able to check the difference and effects with respect to the image before printing and the image of the printed result.

Further, in the printing system 1 according to the embodiment, the client apparatus 20 includes the data converting unit 202 in a manner similar to the printing server 10. Accordingly, files having various extensions may be input as data to be printed, and the input data may then be converted into data of printable formats. Accordingly, the client apparatus 20 may be able to generate and display preview images that are adapted to files of various types of data formats.

Figure 14:
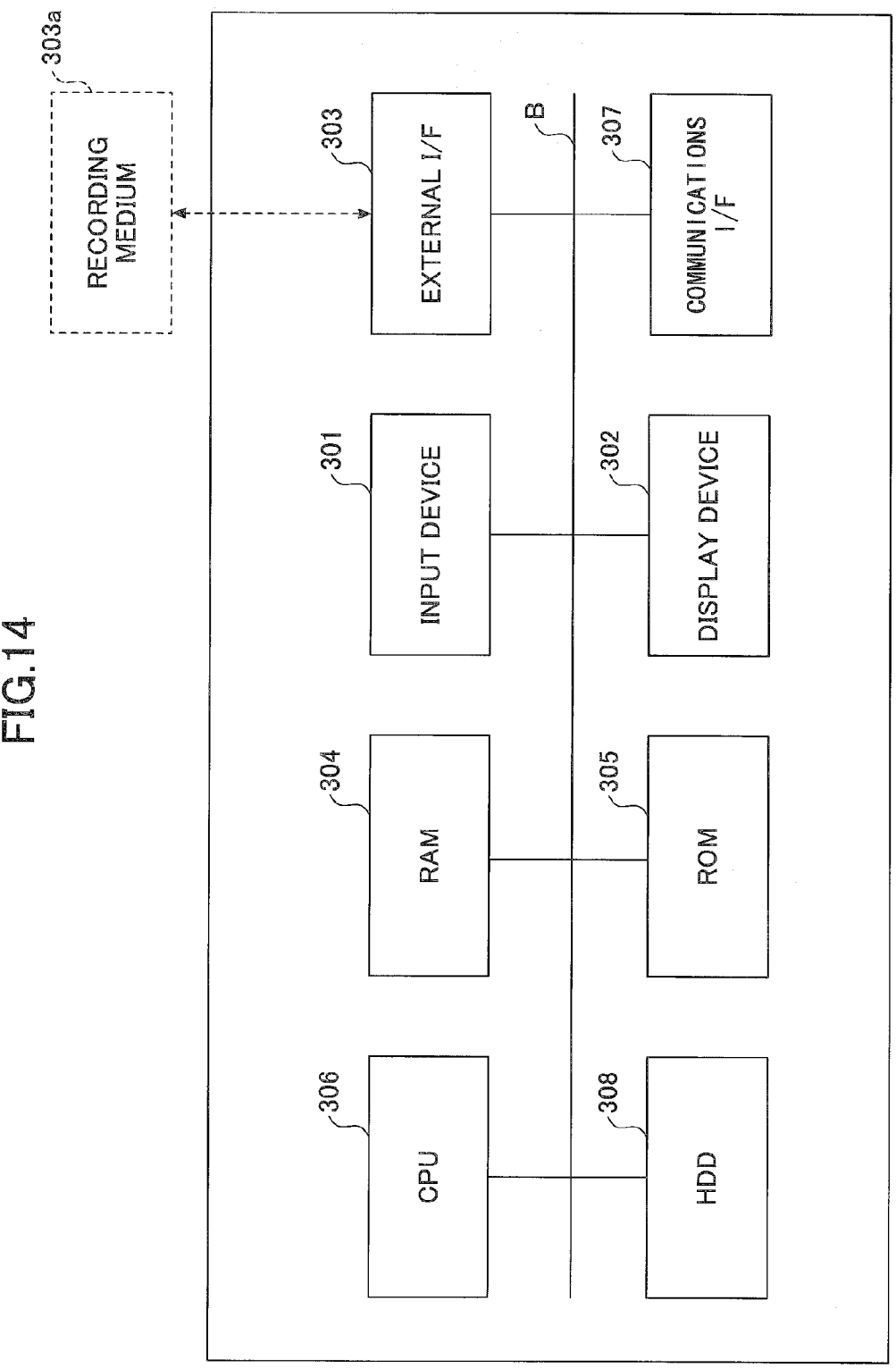
FIG. 14 is a hardware configuration diagram illustrating a client apparatus according to an embodiment.

Finally, illustration is given of a hardware configuration example of the client apparatus 20 according to an embodiment. FIG. 14 illustrates the hardware configuration example of the client apparatus according to the embodiment. As illustrated in FIG. 14, the client apparatus 20 includes an input device 301, a display device 302, an external I/F (interface) 303, a RAM (random access memory) 304, a ROM (read only memory) 305, a CPU (central processing unit) 306, a communications I/F (interface) 307, and an HDD (hard disk drive) 308, and the like that are mutually connected via a bus B.

The input device 301 includes a keyboard, a mouse, a touch panel and the like that are used to input various types of operations signals to the client apparatus 20. The display device 302 includes a display and the like, and is configured to display a preview image or an input image as a result of being processed by the client apparatus 20.

The communications I/F 307 serves as an interface configured to connect the client apparatus 20 to a network 40. Accordingly, the client apparatus 20 may be able to communicate with other apparatuses (e.g., the "printing server 10" etc.) via the communications I/F 307.

The HDD 308 is a nonvolatile recording device configured to store programs or data. Examples of such programs or data stored in the HDD 308 may include an OS (operating system) serving as basic software configured to control the overall client apparatus 20, or application software that provides various functions operated on the OS. Further, the HDD 308 is configured to manage the stored programs or data by a predetermined file system and/or a DB (database).

The external I/F 303 is configured to serve as an interface between an external device and the client apparatus 20. The external device may include a recording medium 303a. Hence, the client apparatus 20 may be able to read data from or write data onto the recording medium 303a via the external I/F 303. Examples of the recording medium 303a include a floppy (registered trademark) disk, a CD (compact disk), a DVD (digital versatile disk), an SD (secure digital) memory card, a USB (universal serial bus) memory, and the like.

The ROM (read only memory) 305 is nonvolatile semiconductor memory (a nonvolatile storage device) configured to retain internal data when the power is switched off. The ROM 305 is configured to store programs or data utilized for setting BIOS (basic input/output system), the OS, and the network 40 at the startup of the client apparatus 20. The RAM (random access memory) 304 is volatile semiconductor memory (a volatile storage device) configured to temporarily retain programs or data. The CPU (central processing unit) 306 may be a processor device that is configured to implement an overall control over the client apparatus 20 or functions of the client apparatus 20. The overall control or functions may implemented by retrieving programs or data from the storage device (e.g., the HDD 308 or the ROM 305), and executing the retrieved programs, processes, and the like.

The data converting unit 202, the RIP unit 203, the operations unit 206 and the selecting unit 207 included in the client apparatus 20 may be implemented by the programs installed in the HDD 305 that cause the CPU 306 to execute processes. The image data DB 208 and the printing condition DB 209 may be implemented by utilizing the RAM 304 or the HDD 308, or may alternatively be implemented by utilizing a storage device connected to the client apparatus 20 via the network 40.

As described above, since the client apparatus 20 according to the embodiment includes the above-described hardware configuration, the client apparatus 20 may be able to provide various information processing services including generating preview images, and displaying the preview images and input images.

According to an aspect of the above-described embodiments, preview images before printing may be quickly displayed.

The preferred embodiments of the client apparatus, the printing system, the display method, and the program are described above; however, the technical scope of the present invention is not limited to the above-described examples and embodiments. It is obvious that various alternations and modifications may be made by a person with an ordinary skill in the art to which the invention pertains within categories of the technical idea disclosed in the scope of claim for patent, and hence, those may naturally fall within the technical scope of the client apparatus, the printing system, the display method, and the program of the disclosures. Further, in a case where there are plural embodiments and modifications, those may be combined insofar as the combinations are consistent.

The present invention is not limited to the specifically disclosed embodiments, and variations and modifications may be made without departing from the scope of the present invention.

The present application is based on Japanese Priority Application No. 2013-054337 filed on Mar. 15, 2013, and Japanese Priority Application No. 2014-037006 filed on Feb. 27, 2014, the entire contents of which are hereby incorporated herein by reference.

What is claimed is:

1. A client apparatus connected to a printing server and configured to instruct the printing server to execute printing, the client apparatus, comprising:
a converting unit configured to convert a format of first data to be printed into a first printable format according to a first printing condition, and convert a format of second data to be printed into a second printable format according to a second printing condition;
an image generator configured to sequentially generate (i) a first preview image of the converted first data to be printed based on data associated with the first printable format and based on the first printing condition, and (ii) a second preview image of the converted second data to be printed based on data associated with the second printable format and based on the second printing condition; and
a display unit configured to display one of the first preview image and the second preview image.

2. The client apparatus as claimed in claim 1, further comprising:
a storage unit configured to store the converted first data to be printed and the converted second data to be printed,
wherein when at least one of the converted first data to be printed and the converted second data to be printed is stored in the storage unit, the image generator sequentially generates the first preview image and the second preview image.

3. The client apparatus as claimed in claim 1, further comprising:
an operations unit configured to set another printing condition to the displayed one of the first data to be printed and the second data to be printed, wherein
the image generator is configured to regenerate one of the first preview image and the second preview image according to the set printing condition.

4. The client apparatus as claimed in claim 3, wherein,
the storage unit is configured to store the first printing condition used for generating the first preview image with first identifier information of the first preview image, and the second printing condition used for generating the second preview image with second identifier information of the second preview image, and
wherein the client apparatus further comprises,
a communications unit configured to transmit to the printing server the displayed one of converted first data to be printed and the converted second data to be printed, the displayed one of the converted first data to be printed and the converted second data to be printed being transmitted with the first printing condition stored with the first identifier information and the second printing condition stored with the second identifier information.

5. The client apparatus as claimed in claim 1, further comprising:
a selecting unit configured to select any one of the converted first data to be printed and the converted second data to be printed, wherein
the display unit displays the selected one of the converted first data to be printed and the converted second data to be printed.

6. The client apparatus as claimed in claim 5, wherein
the display unit displays (i) the selected one of the converted first data to be printed and the converted second data to be printed and (ii) a preview image of the selected one of the converted first data to be printed and the converted second data to be printed.

7. A printing system comprising:
a client apparatus; and
a printing server connected to the client apparatus via network, the client apparatus instructing the printing server to execute printing,
wherein the client apparatus includes,
- a converting unit configured to convert a format of first data to be printed into a first printable format according to a first printing condition, and convert a format of second data to be printed into a second printable format according to a second printing condition;
- an image generator configured to sequentially generate (i) a first preview image of the converted data to be printed based on data associated with the first printable format and based on the first printing condition, and (ii) a second preview image of the converted second data to be printed based on data associated with the second printable format and based on the second printing condition;
- a display unit configured to display one of the first preview image and the second preview image; and
- a communications unit configured to transmit the one of the converted first data to be printed and the converted second data to be printed to the printing server, and wherein the printing server prints the transmitted data to be printed.

8. A display method executed by a computer of a client apparatus, the client apparatus being connected to a printing server and being configured to instruct the printing server to execute printing, the display method, comprising:
- converting (i) a format of first data to be printed into a printable format according to a first printing condition, and (ii) a format of second data to be printed into a printable format according to a second printing condition;
- sequentially generating (i) a first preview image of the first data to be printed according to the printing condition and based on an first printing condition and (ii) a second preview image of the converted second data to be printed based on data associated with the second printable format and based on the second printing condition; and
- displaying one of the first preview image and the second preview image.

* * * * *